United States Patent [19]

Myers

[11] Patent Number: 5,750,656

[45] Date of Patent: May 12, 1998

[54] PROCESS FOR SULFONATING OR SULFATING POLYMERS

[75] Inventor: Michael O. Myers, Baton Rouge, La.

[73] Assignee: The Dow Chemical Company, Midland, Mich.

[21] Appl. No.: 656,141

[22] Filed: May 31, 1996

[51] Int. Cl.⁶ .................................................. C08G 75/00
[52] U.S. Cl. ..................... 528/373; 528/379; 528/381; 528/486; 528/488; 528/492; 525/7; 525/71; 525/8; 525/13; 525/14; 525/15; 525/17; 525/88; 525/95; 524/505
[58] Field of Search ........................ 528/373, 379, 528/381, 486, 488, 492; 525/7, 7.1, 8, 13, 14, 15, 17, 88, 95; 524/505

[56] References Cited

U.S. PATENT DOCUMENTS 4,372,862   2/1983   Miller .................................. 252/33

*Primary Examiner*—Duc Truong

[57] ABSTRACT

The invention is a process for the preparation of a sulfur-containing polymer, comprising:

A. contacting sulfuric acid with one or more of fatty acid, fat or oil, and an inert solvent that allows dispersion of the sulfuric acid;

B. contacting the mixture from Part A with a polymer which contains olefinic and/or aromatic unsaturation and, optionally, an organic acid anhydride under conditions such that a homogeneous sulfated or sulfonated polymer is formed wherein a sulfonated polymer is prepared when organic anhydride is present; and, optionally, C. contacting the mixture from Part B with a metal salt or one or more amine compounds under conditions such that a salt or neutralized form of a sulfated or sulfonated polymer is prepared.

The process of the invention allows the preparation of homogeneous sulfonated or sulfated polymers at relatively high solids levels and at elevated temperatures. The invention is also a polymer that is compatible in paving materials such that improved storage stability is imparted to the paving materials along with improved viscoelastic properties under cold and hot conditions.

20 Claims, No Drawings

PROCESS FOR SULFONATING OR SULFATING POLYMERS

BACKGROUND OF THE INVENTION

The invention relates to a process for preparing sulfonated or sulfated polymers.

The sulfonated or sulfated polymers of the invention, neutralized with inorganic or organic bases, are useful in combination with asphalts for paving materials, roofing materials, automobile undercoatings and other coating applications, etc. Compatibility between the polymer and asphalt, which is enhanced by sulfonating or sulfating the polymer, is very important to ensure that the properties of both are transferred to the finished product for good long-term performance. Asphalt that is compatible with polymers in a blend can impart better performance of the asphalt with respect to flexibility, longevity, elasticity, and thermal stability for its use as paving or coating material.

Sulfonation or sulfation of polymers, and subsequent neutralization, can be used to alter the wettability of polymers. It can also make them more compatible with more polar polymers in blends or alloys. Sulfonation or sulfation can also be used to produce ionomers, which may have enhanced properties, such as higher tensile strength or a higher use temperature.

U.S. Pat. No. 5,288,773 discloses a method for preparing sulfonated linear and radial block copolymers. The process disclosed involves mixing the copolymer of (poly)styrene and a conjugated diene, acetic anhydride and concentrated sulfuric acid, and reacting the mixture at a temperature sufficient to form a sulfonated copolymer. This process does not permit a completely homogeneous product at high solids levels or elevated temperatures that are typical of commercial polymer processes.

What is needed is a process for sulfonating or sulfating polymers which contains olefinic and/or aromatic unsaturation that allows synthesis of a homogeneous product even at relatively high solids levels and elevated temperatures. What is also needed is a polymer that is compatible in paving materials such that improved storage stability is imparted to the paving materials along with improved viscoelastic properties under cold and hot conditions.

SUMMARY OF THE INVENTION

The invention is a process for the preparation of a sulfur-containing polymer, comprising:

A. contacting sulfuric acid with one or more of fatty acid, fat or oil, and an inert solvent that allows dispersion of the sulfuric acid;

B. contacting the mixture from Part A with a polymer which contains olefinic and/or aromatic unsaturation and, optionally, an organic acid anhydride under conditions such that a homogeneous sulfated or sulfonated polymer is formed wherein a sulfonated polymer is prepared when organic anhydride is present; and, optionally, C. contacting the mixture from Part B with a metal salt or one or more amine compounds under conditions such that a salt or neutralized form of a sulfated or sulfonated polymer is prepared.

The process of the invention allows the preparation of homogeneous sulfonated or sulfated polymers at relatively high solids levels and at elevated temperatures. The invention is also a polymer that is compatible in paving materials such that improved storage stability is imparted to the paving materials along with improved viscoelastic properties under cold and hot conditions.

DETAILED DESCRIPTION OF THE INVENTION

The solvent used is preferably a solvent which is inert to the sulfuric acid, allows dispersal of the acid and does not undergo sulfonation. Preferred solvents include hydrocarbons, partially or completely halogenated hydrocarbons, and ethers. More preferred solvents include hydrocarbons with from about 4 to about 20 carbons, chlorinated hydrocarbons with about 1 to about 4 carbons, and aliphatic or cycloaliphatic ethers with from about 2 to about 10 carbons. Even more preferred solvents include hexane, isopentane, n-pentane, heptane, cyclohexane, octanes petroleum ether, paraffinic and isoparaffinic hydrocarbons, dichloromethane, chloroform, carbon tetrachloride, and tetrahydrofuran. Most preferred solvents include cyclohexane, hexane, and dichloromethane.

Useful fatty acids, fats or oils are those that facilitate dispersal of the sulfuric acid. Preferred fatty acids include carboxylic acids that have from about 8 to about 30 carbons, or any that can be obtained from hydrolysis of simple lipids, including animal fats and vegetable and fish oils. More preferred fatty acids include stearic acid, oleic acid, lauric acid, myristic acid, palmitic acid, linoleic acid, linolenic acid, elaidic acid, and eleostearic acid or mixtures and combinations thereof. Most preferred fatty acids include stearic and oleic acid.

Preferred fats or oils are those that are derived from animal, fish, or vegetable sources, or synthetic mono-, di- or triglycerides which have from 1 to 3 fatty acid units. More preferred fats and oils include beef tallow, lard, and chicken fats, oils derived from fish, and vegetable or seed oils such as coconut, sunflower seed, palm, cottonseed, soybean, canola, peanut, castor, olive, corn, safflower, linseed, and tung oils. Most preferred fats and oils include sunflower seed, cottonseed, soybean, peanut, palm and corn oils.

Suitable polymers and copolymers are those that contain olefinic or aromatic unsaturation, or a combination of olefinic and aromatic unsaturation. The olefinic unsaturation may be hydrogenated from about 0 to about 99 percent. Preferred polymers are polymers or copolymers of one or more of the following: monoalkenyl arenes, dialkenyl arenes, olefins, and conjugated dienes.

Conjugated dienes useful in the copolymer include straight- and branched-chain aliphatic hydrocarbons containing two double bonds attached to adjacent carbon atoms. Preferred dienes contain 4 to 6 carbon atoms and include butadiene, isoprene, 1,3-pentadiene, 1,3-hexadiene, 2,3-diemthylbutadiene and mixtures thereof. More preferably, such conjugated dienes contain from about 4 to about 5 carbon atoms and include, for example, butadiene, isoprene, cis-1,3-pentadiene, trans-1,3-pentadiene and mixtures thereof. The most preferred dienes are butadiene and isoprene.

Monoalkenyl or dialkenyl arenes useful in this invention include compounds having an aromatic ring, preferably monocyclic, with an alkenyl moiety bound thereto which is capable of polymerizing under anionic conditions. Preferred monoalkenyl or dialkenyl arenes correspond to the formula:

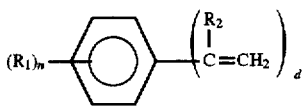

where d is an integer from 1 to 2, n is an integer from 0 to 3, $R_1$ is an alkyl moiety containing up to 5 carbon atoms and $R_2$ is hydrogen or methyl. Preferred monoalkenyl or dialkenyl arenes are styrene or alkyl-substituted styrenes such as vinyltoluene (all isomers, alone or in admixture), alpha-methylstyrene, 4-tertiarybutylstyrene, 4-methylstyrene, 3,5-diethyl-styrene, 3,5-di-n-butylstyrene, 4-(4-phenyl-n-butyl) -styrene 2-ethyl-4-benzylstyrene, 4-cyclohexylstyrene, 4-n-propylstyrene, 4-dodecylstyrene, divinylbenzene (all isomers) and diisopropenylbenzene (all isomers), and mixtures and combinations thereof. More preferred monoalkenyl or dialkenyl arenes include styrene, vinyltoluene, alpha-methylstyrene, divinylbenzene (all isomers) and diisopropenylbenzene (all isomers), and mixtures and combinations thereof. Even more preferred alkenyl arenes are styrene and mixtures of styrene and alpha-methylstyrene and mixtures and combinations thereof.

More preferred polymers include polymers or copolymers of one or more of the following monomers: styrene, alpha-methylstyrene, vinylpyridine, divinylbenzene, butadiene, isoprene, ethylene, propylene, butylene, isobutylene, octene, and norbornene. Even more preferred polymers include polystyrene, poly(alpha-methylstyrene), EPDM rubbers, polybutadiene rubbers, polyisoprene rubbers, natural rubber, copolymers of styrene with ethylene and/or propylene, random copolymers of styrene with butadiene and/or isoprene, block or tapered-block copolymers of two or more of the following: styrene, alpha-methylstyrene, butadiene or isoprene.

Preferred are block copolymers of monoalkenyl arenes and conjugated dienes comprising from about 70 to about 95 parts by weight of one or more block copolymer(s) corresponding to one of the formulae: A—B—R(—B—A)$_n$ (Formula I) or A$_x$—(BA—)$_y$—BA (Formula II) wherein each A is a polymer block comprising a monovinylidene aromatic monomer and each B is a polymer block comprising a conjugated diene and, optionally, a monovinylidene aromatic monomer, R is the remnant of a multifunctional coupling agent, n is an integer from about 1 to about 20, x is about 0 or 1, and y is a real number from about 0 to about 4. The polymers preferred for use in the preparation of sulfonated or sulfated polymers are one or more block copolymers according to Formulae I or Formula II.

More preferred block copolymers include styrene-butadiene-styrene and styrene-isoprene-styrene block copolymers. Preferably, the amount of monoalkenyl arenes in the final block copolymer is 5 percent or greater, more preferably 10 percent or greater, and most preferably 14 percent or greater. Preferably, the percentage of monoalkenyl arenes in the final block copolymer is 50 percent or less, more preferably 45 percent or less, even more preferably 40 percent or less and most preferably 30 percent or less. The polymers or copolymers preferably have a weight average molecular weight of about 250 Daltons or greater, and more preferably about 500 Daltons or greater, even more preferably about 1,000 Daltons or greater; preferably about 5,000,000 Daltons or less, more preferably about 1,000,000 Daltons or less, and most preferably about 400,000 Daltons or less. Molecular weights are determined according to gel permeation chromatography using polystyrene standards. Commercially available polystyrene standards were used for calibration and the molecular weights of copolymers corrected according to Runyon et al., *J. Applied Polymer Science*, vol., 13, p. 2359, (1969); and Tung, L. H., *J. Applied Polymer Science*, vol., 24, p. 953 (1979).

The sulfuric acid can be contacted with a solvent and a fatty acid, or compounds which contain fatty acid esters, such as animal fats and oils, and vegetable oils, or previously sulfated derivatives thereof, by any conventional means known to one skilled in the art. The sulfuric acid, solvent and fatty acid, fat or oil can be contacted in any order under conditions of mixing. Preferably, the sulfuric acid and fatty acid, fat or oil can be contacted with the solvent. The time of addition of the sulfuric acid and fatty acid, fat or oil into the solvent and subsequent mixing of the sulfuric acid mixture should be sufficient to ensure an effective dispersion of the sulfuric acid and fatty acid in the solvent. Preferably, the time of addition and subsequent mixing of sulfuric acid and fatty acid, fat or oil into the solvent can be about 0.01 minute or greater, more preferably about 0.1 minute or greater, and even more preferably about 1 minute or greater. Preferably, the time of addition and mixing can be about 240 minutes or less, more preferably about 60 minutes or less, and even more preferably about 15 minutes or less.

Generally, contacting sulfuric acid with a fatty acid, fat or oil results in sulfation of the fatty acid, fat or oil, particularly in the case in which there is olefinic unsaturation present in the fatty acid, fat or oil. If there is sufficient fatty acid, fat, or oil present, the product of contacting this with sulfuric acid and solvent is a homogeneous solution, rather than a dispersion.

The amount of sulfuric acid used should be enough to sulfonate or sulfate the polymer but not so much as to create too high a viscosity upon reaction with the polymer. The degree of sulfation or sulfonation may be controlled by the amount of sulfonating agent relative to the weight of the polymer. Based upon the weight of the polymer, the amount of sulfuric acid is preferably about 0.01 weight percent or greater, more preferably about 0.1 weight percent or greater, and even more preferably about 1 weight percent or greater. The amount of sulfuric acid added is preferably about 25 weight percent or less, more preferably about 10 weight percent or less, and even more preferably about 5 weight percent or less, based on the weight of the polymer. The amount of fatty acid should be enough to facilitate the dispersion of the sulfuric acid in the polymer. Based upon the weight of the sulfuric acid added, the ratio of weight of fatty acid, fat or oil to weight of sulfuric acid is preferably about 0.05:1 or greater, more preferably about 0.25:1 or greater, and even more preferably about 0.5 or greater. The ratio of weight of fatty acid, fat or oil to weight of sulfuric acid is preferably about 20:1 or less, more preferably about 10:1 or less, and even more preferably about 5:1 or less.

During addition and mixing of the sulfuric acid and fatty acid, fat or oil into the solvent, the mixture can be contacted at a temperature such that the mixture is handleable. Preferably, the temperature is about 0° C. or greater, more preferably about 10° C. or greater, and even more preferably about 20° C. or greater. Preferably, the temperature is about 100° or less, more preferably about 70° C. or less and even more preferably about 40° C. or less. The addition and mixing of the sulfuric acid, fatty acid, fat or oil and solvent is preferably performed under atmospheric conditions. Preferably, further mixing of the sulfuric acid mixture once all of the sulfuric acid and fatty acid, fat or oil have been contacted with the solvent can be about 0.01 minute or greater, more preferably about 0.1 minute or greater and even more preferably about 1 minute or greater following completion of addition of the sulfuric acid and fatty acid, fat or oil. Preferably, further mixing of the sulfuric acid mixture once all of the sulfuric acid and fatty acid, fat or oil have been contacted with the solvent can be about 10 minutes or less following completion of addition of the sulfuric acid and fatty acid, fat or oil.

Following the contacting of the sulfuric acid and fatty acid, fat or oil with a solvent, the sulfuric acid mixture is then contacted with a polymer, preferably dissolved in a suitable solvent as defined above. The polymer will preferably be dissolved in a solvent prior to mixing with the sulfuric acid mixture in order to permit good dispersal of the polymer. The solvent may be that in which the polymer is made, or the dry polymer may be dissolved in solvent prior to use. Suitable solvents are described above. Preferably, the amount of polymer dissolved in the solvent is about 1 weight percent or greater, more preferably about 5 weight percent or greater, and even more preferably about 10 weight percent or greater. Preferably, the amount of polymer dissolved in the solvent is about 50 weight percent or less, more preferably about 40 weight percent or less, and even more preferably about 30 weight percent or less. The polymer can be contacted with the solvent by any method known to one skilled in the art. The contacting of the polymer with the solvent may be performed at ambient temperature or the temperature at which the copolymer is being processed.

The conditions under which the sulfuric acid mixture and copolymer mixture are contacted can be any conditions conventionally used by one skilled in the art. The sulfuric acid will preferentially sulfate or sulfonate at the point of olefinic unsaturation in the polymer. If there is no olefinic unsaturation, the polymer will be sulfonated on the aromatic ring. Preferably, the mixtures can be contacted over a period of time in order to ensure good blending and reaction of the polymer mixture with the sulfuric acid mixture. Preferably, the sulfuric acid mixture can be added to the polymer mixture over a period of about 0.01 minute or greater, more preferably about 0.1 minute or greater, and even more preferably about 0.5 minute or greater. Preferably, the sulfuric acid mixture can be added to the polymer mixture over a period of 120 minutes or less, more preferably about 60 minutes or less, and even more preferably about 15 minutes or less. The sulfuric acid mixture can be contacted with the copolymer mixture at a temperature sufficient to allow good mixing to occur but not so high as to cause degradation of the polymer. Preferably, the temperature is about 0° C. or greater, more preferably about 10° C. or greater, and even more preferably about 20° C. or greater. Preferably the temperature is about 120° C. or less, more preferably about 100° C. or less, and even more preferably about 80° C. or less.

If sulfonation of the polymer is desired, an organic acid anhydride may be added in order to facilitate the sulfonation. If sulfation of the polymer is desired, organic acid anhydride is not used. Preferable organic acid anhydrides include acetic, propionic, succinic, maleic, phthalic, isophthalic, terephthalic, and benzoic. More preferable organic acid anhydrides include acetic, propionic, and maleic anhydrides. Most preferable organic acid anhydrides include acetic and propionic anhydrides. The organic acid anhydride may preferably be added to the polymer mixture prior to contacting the sulfuric acid mixture with the polymer mixture, simultaneously with the contacting or immediately subsequent to the contacting. The amount of organic acid anhydride used is that which is sufficient to facilitate the sulfonation of the polymer with at least enough to react with all active hydrogens present. Generally, at least the molar amount of acid anhydride is required to react with any water or alcohols or other anhydride-reactive species (except sulfuric acid) present, plus the amount required to react with the sulfuric acid.

Preferably, the organic acid anhydride is contacted with the polymer in a ratio, over and above that added to react with or scavenge any other anhydride-reactive impurities, of about 0.5:1 acid anhydride to $H_2SO_4$ or greater, more preferably about 0.75:1 acid anhdyride to $H_2SO_4$ or greater, and even more preferably about 0.9:1 acid anhdyride to $H_2SO_4$ or greater. Preferably, the organic acid anhydride is contacted with the polymer in a ratio of about 10:1 acid anhydride to $H_2SO_4$ or less, more preferably about 5:1 acid anhdyride to $H_2SO_4$ or less, and even more preferably about 2:1 acid anhydride to $H_2SO_4$ or less.

Preferably, once the contacting is complete, the mixture is mixed and the reaction continued for about 1 minute or greater, more preferably about 5 minutes or greater, and even more preferably about 10 minutes or greater. Preferably, once the contacting is complete, the mixture is mixed and the reaction continued for about 120 minutes or less, more preferably about 60 minutes or less, and even more preferably about 30 minutes or less. The contacting may preferably be performed under atmospheric conditions. The solids level of the sulfuric acid and polymer mixture should be such that the viscosity is low enough to allow good dispersion of the sulfuric acid mixture in the polymer mixture. Preferably, the solids level is about 1 percent or greater, more preferably about 5 percent or greater and even more preferably about 10 percent or greater. Preferably, the solids level is about 50 percent or less, more preferably about 40 percent or less and even more preferably about 30 percent or less.

The reaction product of the copolymer mixture and the sulfuric acid mixture may be neutralized by forming the sulfate or sulfonate salt of the reaction product. Neutralization can be desirable because the reaction product of the copolymer mixture and the sulfuric acid mixture is not stable unless it undergoes neutralization. Preferred compounds which will neutralize the reaction include basic salts of alkali metals, alkaline earth metals, transition metals, or amine compounds. More preferred compounds include carboxylic acid salts, hydroxide salts, carbonate salts, alkoxide salts, or oxides of Li, Na K, Ca, Mg, Zn, Fe, Al, Cu, Rb, Cs, Sr or Ba, and ammonia, or organic amine compounds. Organic amine compounds include alkylamines, alkyldiamines, arylamines, aryldiamines, alkyltriamines, amino acids, urea, alkanolamines, lactams, and amides. Most preferred compounds include hydroxides or acetates of Na, K, Ca, Mg, and Zn, ammonia, ethylene diamine, 1,6-hexanediamine, isopropanolamine, diisopropanolamine, ethanolamine, and diethanolamine. The amount of the compound used will be sufficient to neutralize the reaction product of the copolymer mixture and the sulfuric acid mixture and form the sulfate or sulfonate salt of the reaction product. The amount of the compound necessary to neutralize the reaction is preferably about 0.25 equivalent per mole of $H_2SO_4$ or greater, more preferably about 0.5 equivalent per mole of $H_2SO_4$ or greater, and even more preferably about 0.9 equivalent per mole of $H_2SO_4$ or greater. The amount of the compound necessary to neutralize the reaction is preferably about 10 equivalent per mole of $H_2SO_4$ or less, more preferably about 5 equivalent per mole of $H_2SO_4$ or less, and even more preferably about 3 equivalent per mole of $H_2SO_4$ or less.

Preferably, once the reaction is complete and/or neutralization is complete, the sulfated or sulfonated copolymer mixture can be recovered by any means known to those skilled in the art. This includes coagulation or precipitation by addition of an alcohol, devolatilization of the solvent under heat and/or vacuum, steam stripping of the solution in boiling water, or extrusion in a devolatilizing extruder.

The sulfated or sulfonated block copolymers of this invention have application as additives to produce novel polymer-modified asphaltic compositions having improved viscoelastic properties, softening points, and storage stability/compatibility as compared to unsulfated or unsulfonated copolymers. The sulfated or sulfonated polymers of this invention are useful in combination with asphalts for paving materials, roofing materials, automobile undercoatings and other coating applications. Sulfated or sulfonated polymers of this invention are useful in increasing the storage stability of asphalts for paving or roofing applications. The polymers of this invention reduce the tendency of asphalt to creep and rut in warm weather by increasing its high temperature viscoelastic stiffness. Polymers of this invention can also minimize cracking and stripping in cold weather by improving the asphalt's low temperature viscoelatic properties. A road paving composition can comprise a blend of a sulfated polymer composition and asphalt wherein the blend has the asphalt and sulfated polymer dispersed such that the blend is storage stable and substantially phase compatible and the sulfated polymer composition is the neutralized salt of the sulfated sytrene-butadiene or styrene-isoprene block copolymer. Preferably, the sulfated or sulfonated block copolymers of this invention are storage stable if the difference between the top and bottom softening points, based on performance of the ring and ball softening point test, is less than about 5° C.

ILLUSTRATIVE EMBODIMENTS OF THE INVENTION

The following examples are provided to illustrate the invention, but are not intended to limit the scope thereof. All parts and percentages are by weight unless otherwise indicated.

COMPARATIVE EXAMPLE 1

Sulfonation of Styrene-Butadiene Block Copolymers without Dispersant

A 500 mL kettle with water jacket and stirrer was loaded with 402 grams of a 20 percent by weight solution of VECTOR™ 2411D radial styrene-butadiene block copolymer (available from Dexco Polymers) (247,000 peak molecular weight by GPC, corrected, and 30 weight percent styrene) in an approximately 85 percent/15 percent mixture by weight of cyclohexane and isopentane. This solution contained no antioxidants or other additives. The solution was heated to about 70° C. by circulation of hot water through the jacket with rapid stirring. Propionic anhydride (97 percent, 2.69 grams) was dissolved in 20 mL lab cyclohexane (contains about 8 percent n-hexane) and added to the polymer solution 1.0 minute prior to the introduction of acid. Sulfuric acid (96.8 percent, 1.27 grams) was then added rapidly via syringe using a No. 18 needle at a solution temperature of 68° C. A large number of dark particles or droplets, about 1 to 2 mm in diameter, formed immediately. At 10.5 minutes from initial $H_2SO_4$ addition, 37.0 mL of 0.20 g/mL zinc acetate dihydrate in 18:1 vol./vol. methanol/water was added to neutralize the reaction and form the zinc salt of the sulfonated polymer. After stirring 30 minutes, 0.40 gram of Irganox™ 1010, a trademark of Ciba Geigy, antioxidant was added to the product solution. The product was obviously non-homogeneous, and a layer of dark material tended to precipitate from the product solution on standing.

The product was isolated by stirring the solution with boiling water to strip off the solvent, then drying it in a vacuum oven at 100° C. Sulfonated organics are commonly distinguished from sulfated materials based on the fact that the C-O-S linkage in a sulfated material is readily hydrolyzed under acidic conditions. A sample of the product was prepared for determination of soluble, non-hydrolyzable sulfur by shaking a portion of polymer solution, diluted to <5 percent solids with toluene, with 0.1 N hydrochloric acid, followed by neutralization with sodium bicarbonate and washing with water then allowing the organic portion to stand overnight, decanting the solution from any precipitate, and vacuum drying at 100° C. The sulfur content of this sample, and the steam-stripped product, was analyzed using a Carlo Erba elemental analyzer. The steam-stripped sample was found to contain 0.36 percent S by weight while the sample prepared for determination of soluble sulfur contained 0.17 percent S. This demonstrates that over one-half of the sulfur in the product was either present as insoluble material or as sulfate groups.

COMPARATIVE EXAMPLE 2

Sulfation of Styrene-Butadiene Block Copolymers without Dispersant

The reaction apparatus of Comparative Example 1 was loaded with 300 grams of VECTOR 2411 solution at about 20 percent solids. The solution was heated to about 70° C. with rapid agitation. Sulfuric acid (100 percent, 1.47 grams) was added via syringe and needle over about 4 minutes. Dark specks were observed on addition of acid. After 20 minutes, 3.61 grams of zinc acetate dihydrate in 18:1 MeOH/$H_2O$ was added. Dark specks or particles were noted in the final product, and these settled out after standing for about an hour. The product was obviously non-homogeneous.

EXAMPLE 1

Sulfonation of Styrene-Butadiene Block Copolymer With Fatty Acid Dispersant

The reaction apparatus of Comparative Example 1 was loaded with 400 grams of the same polymer solution. The solution was heated to about 70° C. with rapid agitation. Propionic anhydride (97 percent, 2.68 grams) was dissolved in 20 mL lab cyclohexane. A plastic syringe was loaded with 25 mL of lab cyclohexane containing 0.25 gram stearic acid, and 1.26 grams of 96.8 percent sulfuric acid was added to the syringe. The mixture was shaken for 3 minutes and was observed to form a dispersion of acid in the solvent. The propionic anhydride solution was added to the polymer solution at 68° C. One minute later, the acid dispersion was added rapidly to the kettle through a No. 18 needle. Addition of the acid dispersion required approximately 20 seconds. No formation of dark particles was observed and the solution turned a uniform dark brown color in 30 to 60 seconds. At 10.5 minutes from initial $H_2SO_4$ addition, 25.8 mL of 0.286 g/mL zinc acetate dihydrate in 18:1 vol./vol. methanol/water was added to neutralize the reaction and form the zinc salt of the sulfonated polymer. After stirring for 30 minutes, 0.40 grams of Irganox™ 1010 was added to the product solution. The product appeared homogeneous and no dark precipitate was observed on standing.

The product was isolated as described in Comparative Example 1 above and a sample was prepared for determination of soluble, non-hydrolyzable sulfur as described previously. The steam-stripped sample was found to contain 0.33 percent S by weight while the sample prepared for determination of soluble, non-hydrolyzable sulfur contained 0.38 percent S. This data shows absence of sulfur in the form of insoluble material as observed in Comparative Example 1.

EXAMPLE 2

Sulfonation of Styrene-Butadiene Block Copolymer with Fatty Acid Dispersant and Neutalization with Alkanolamine The apparatus of Comparative Example 1 was used, with the 500 mL kettle replaced with a 1000 mL kettle. The kettle was loaded with 796 grams of VECTOR 2411 solution at 21 percent solids. The solution was heated to about 70° C. with rapid agitation. A syringe was loaded with 35 mL of lab cyclohexane plus 1.4 grams of oleic acid, and 2.61 grams of 97.8 percent sulfuric acid was added to the syringe. The mixture was shaken for about 3 minutes and was observed to form a dispersion of acid in the solvent. Acetic anhydride (97 percent, 4.39 grams) was added to the polymer solution five minutes prior to the addition of the acid dispersion. The acid dispersion was added rapidly to the kettle through a No. 18 needle preceded by a small static mixer. Addition of the acid dispersion required approximately 1 minute. No formation of dark particles was observed and the solution turned a uniform, dark-brown color in about 1.5 minutes. At 11.5 minutes from initial $H_2SO_4$ addition, 7.29 mL of neat diethanolamine was added to neutralize the reaction and form the amine salt of the sulfonated polymer. Within about 30 seconds of addition of the amine, the color of the product solution was a clear amber. After stirring for about 20 minutes additional, 0.84 gram of Irganox 1010 was added. The product appeared homogeneous and no precipitate was observed on standing.

The product was isolated as described in Comparative Example 1 above and a sample was prepared for determination of soluble, non-hydrolyzable sulfur as described previously. The steam-stripped sample was found to contain 0.44 percent S by weight, while the sample prepared for determination of soluble, non-hydrolyzable sulfur contained 0.47 percent S.

EXAMPLE 3

Sulfation of Styrene-Butadiene Block Copolymer with Fatty Acid Dispersant

The reaction apparatus of Comparative Example 1, with the 500 mL kettle replaced with a 1000 mL kettle, was loaded with 800 grams of VECTOR 2411 solution at 20 percent solids. The solution was heated to about 70° C. with rapid agitation. A plastic syringe was loaded with 45 mL of a saturated solution of stearic acid in cyclohexane and 3.92 grams of 100 percent percent sulfuric acid was added to the syringe. The mixture was shaken for 5 minutes and was observed to form a dispersion of acid in the solvent. The acid dispersion was added to the kettle through a No. 17 needle. Addition of the acid dispersion required approximately 30 seconds. No formation of dark particles was observed and the solution turned a uniform, dark-brown color in about 2 minutes. At 15 minutes from initial $H_2SO_4$ addition, 10 mL of methanol was added to quench the reaction and observe any insoluble material. No dark specks or insolubles were observed. At 18 minutes from initial acid addition, 79.75 mL of 0.286 g/mL zinc acetate dihydrate in 18:1 vol./vol. methanol/water was added to form the zinc salt of the sulfated polymer. After stirring for an additional 30 minutes. The product appeared homogeneous and no dark precipitate was observed on standing.

EXAMPLE 4

Improved Asphalt Compatibility and Storage Stability for Sulfonated and Sulfated Polymers Compared to Unsulfonated Polymers Portions of a sample of VECTOR 2411 radial styrene-butadiene copolymer were sulfated or sulfonated at 70° C. using stearic acid as the dispersant and utilizing the procedures of Examples 1 and 3. The products were neutralized with zinc acetate in those examples. The neutralized products were isolated by stripping out solvent in boiling water, then drying in an oven at approximately 100° C.

Blends of 3 percent polymer in asphalt by weight were prepared by mixing the polymers with 2 different asphalts at 175° C. for 1 hour. Portions of the blends were poured into aluminum cigar tubes, and these were aged in an oven at 160° C. for 72 hours. At the end of this period, the tubes were cooled to ambient temperature. The top and bottom portions of the sample were removed and the ring and ball softening point of these were determined. The blend was determined to be storage stable if the difference in the top and bottom softening points was less than 5° C.

| EXAMPLE | BASE POLYMER | | SULFATED POLYMER | | SULFONATED POLYMER | |
|---|---|---|---|---|---|---|
| DISPERSANT | — | | Stearic acid | | Stearic acid | |
| ANHYDRIDE | — | | None | | Propionic | |
| Wt. % S | — | | 0.35 | | 0.35 | |
| ASPHALT | BILLINGS[1] | NESTE[2] | BILLINGS[1] | NESTE[2] | BILLINGS[1] | NESTE[2] |
| TOP Soft. Pt. °C. | 79 | 71 | 52 | 47 | 56 | 47 |
| BOTTOM Soft. pt. °C. | 51 | 46 | 52 | 47 | 56 | 47 |
| STORAGE-STABLE? | No | No | Yes | Yes | Yes | Yes |

[1]Exxon Billings AC-10
[2]Neste/Wright AC-5

What is claimed is:

1. A process for the preparation of a sulfur-containing polymer, comprising:
   A. contacting, in the presence of an inert solvent, sulfuric acid with one or more of (i) a fatty acid, (ii) a fat of a vegetable, animal or fish, (iii) an oil of a vegetable, animal or fish, (iv) a synthetic triglyceride that has from 1 to 3 fatty acid units or (v) a sulfated derivative thereof, that disperses the sulfuric acid in the inert solvent and;
   B. contacting the mixture from Part A with a polymer which contains olefenic, aromatic unsaturation or combination thereof under conditions such that a homogeneous sulfated or sulfonated polymer is formed.

2. The process of claim 1 wherein the conditions of step B are such that the sulfated polymer is formed.

3. The process of claim 1 wherein the amount of sulfuric acid is between about 0.1 weight percent to about 10 weight percent by weight of the polymer.

4. The process of claim 1 wherein the fatty acids, fats or oils are selected from the group consisting of stearic acid, oleic acid, lauric acid, myristic acid, palmatic acid, linoleic acid, linolenic acid, elaidic acid, eleostearic acid, beef tallow, lard, chicken fats and oils selected from the group consisting of coconut, sunflower seed, palm, cottonseed, soybean, canola, peanut, castor, olive, corn, safflower, linseed, and tung oils.

5. The process of claim 1 further comprising contacting the mixture from step B with a metal salt or one or more amine compounds under conditions such that a salt or neutralized form of a sulfated or sulfonated polymer is prepared.

6. The process of claim 4 wherein the solvent is hexane, isopentane, n-pentane, heptane, cyclohexane, octane, petroleum ether, paraffinic and isoparaffinic hydrocarbons, dichloromethane, chloroform, carbon tetrachloride, or tetrahydrofuran.

7. The process of claim 5 wherein the sulfuric acid, fatty acid, fat or oil and solvent are mixed for about 240 minutes or less.

8. The process of claim 6 wherein the polymer is a thermoplastic elastomer containing olefinic or aromatic unsaturation.

9. The process of claim 8 wherein the polymer is a styrene conjugated diene block copolymer.

10. The process of claim 9 wherein the olefinic unsaturation of the thermoplastic elastomer may be hydrogenated from about 0 to about 99 percent.

11. The process of claim 10 wherein the polymer is contacted with a solvent prior to addition of the sulfuric acid mixture.

12. The process of claim 11 wherein the polymer-sulfuric acid mixture is mixed for about 60 minutes or less.

13. The process of claim 12 wherein the polymer-sulfuric acid mixture is mixed at about 0° C. to about 90° C.

14. The process of claim 1 wherein the mixture of Part A and polymer of Part B are contacted with an organic acid anhydride under conditions such that the sulfonated polymer is prepared.

15. The process of claim 14 wherein the organic acid anhydride is acetic, propionic, succinic, maleic, phthalic, isophthalic, terephthalic and benzoic acid anhydride.

16. The process of claim 15 wherein the organic acid anhydride is contacted with the polymer in a ratio of about 0.5:1 organic acid anhydride to $H_2SO_4$ to about 10:1 organic acid anhydride to $H_2SO_4$.

17. The process of claim 16 wherein the solids level in the polymer-sulfuric acid mixture is about 0.5 weight percent to about 50 weight percent based on the weight of the mixture.

18. The process of claim 5 wherein the metal salts are selected from the group consisting of carboxylic acid salts, hydroxide salts, carbonate salts, alkoxide salts and oxides of Li, Na, K, Ca, Mg, Zn, Fe, Al, Cu, Rb, Cs, Sr, or Ba and the amine compounds are selected from the group consisting of ammonia, alkylamines, alkyldiamines, arylamines, aryldiamines, alkyltriamines, amino acids, urea, alkanolamines, lactams and amides.

19. The process of claim 14 wherein the organic acid anhydride, used for preparing the sulfonated polymer, is contacted with the polymer prior to addition of the sulfuric acid mixture, simultaneously with the sulfuric acid mixture or immediately after addition of the sulfuric acid mixture to the polymer mixture.

20. The process of claim 14 further comprising contacting the mixture from step B with a metal salt or one or more amine compounds under conditions such that a salt or neutralized form of the sulfonated polymer is prepared.

* * * * *